United States Patent
Rager

(10) Patent No.: US 6,840,705 B2
(45) Date of Patent: Jan. 11, 2005

(54) ASSEMBLY OF TWO PARTS ONE OF WHICH IS FIXED AND THE OTHER REMOVABLE, USED FOR EXAMPLE FOR EQUIPPING A SURGICAL TABLE

(75) Inventor: Pierre Rager, Loury (FR)

(73) Assignee: ALM, Ardon (FR)

( * ) Notice: Subject to any disclaimer, the term of this patent is extended or adjusted under 35 U.S.C. 154(b) by 0 days.

(21) Appl. No.: 10/362,072

(22) PCT Filed: Sep. 12, 2001

(86) PCT No.: PCT/FR01/02837
§ 371 (c)(1),
(2), (4) Date: Jul. 30, 2003

(87) PCT Pub. No.: WO02/23057
PCT Pub. Date: Mar. 21, 2002

(65) Prior Publication Data
US 2004/0009032 A1 Jan. 15, 2004

(30) Foreign Application Priority Data
Sep. 12, 2000 (FR) .......................................... 00 11571

(51) Int. Cl.⁷ ........................... F16B 21/02; F16B 21/06
(52) U.S. Cl. ...................... 403/325; 403/321; 403/327; 403/379.2; 403/DIG. 4; 403/348
(58) Field of Search ................................ 403/315–320, 403/321, 322.1, 323–328, DIG. 4, 378, 379.5, 359.3, 109.1–109.3, 109.6, 109.8, 348–349

(56) References Cited
U.S. PATENT DOCUMENTS

| | | | | |
|---|---|---|---|---|
| 2,489,864 A | * | 11/1949 | Cravener ................. 403/325 X |
| 2,662,712 A | * | 12/1953 | Rose ....................... 403/325 X |
| 3,971,538 A | | 7/1976 | Marvich |
| 4,801,232 A | * | 1/1989 | Hempel .................. 403/348 X |
| 5,022,243 A | * | 6/1991 | Embry et al. |
| 5,074,700 A | * | 12/1991 | Swoboda ................ 403/348 X |
| 5,096,236 A | * | 3/1992 | Thony .................... 403/316 X |
| 5,193,929 A | * | 3/1993 | Kahn ...................... 403/321 X |
| 5,467,619 A | * | 11/1995 | Stillwagon et al. ..... 403/325 X |
| 5,642,960 A | | 7/1997 | Salice |
| 5,681,257 A | * | 10/1997 | Letourneur ............. 403/325 X |

FOREIGN PATENT DOCUMENTS

| GB | 2 175 974 | 12/1986 |
|---|---|---|
| GB | 2 321 185 | 7/1998 |

* cited by examiner

*Primary Examiner*—John R. Cottingham
*Assistant Examiner*—Ryan M. Flandro
(74) *Attorney, Agent, or Firm*—Young & Thompson

(57) ABSTRACT

The assembly of two parts, one of which is fixed and the other of which is removable, includes automatic locking and unlocking elements for securing the removable part to the fixed part. The unlocking elements are mounted on the removable part and are integrated inside it. The removable part has a male end adapted to be received in a complementary female end of the fixed part, snap-fastening against a resilient stop latch inside said female end. The male end is secured to a longitudinal spindle extending inside the removable part and terminated by a handle for manual actuation, thus enabling the male end to be turned in order to unlock the assembly of the two parts. The male end is returned automatically to its locking position by a return spring.

8 Claims, 3 Drawing Sheets

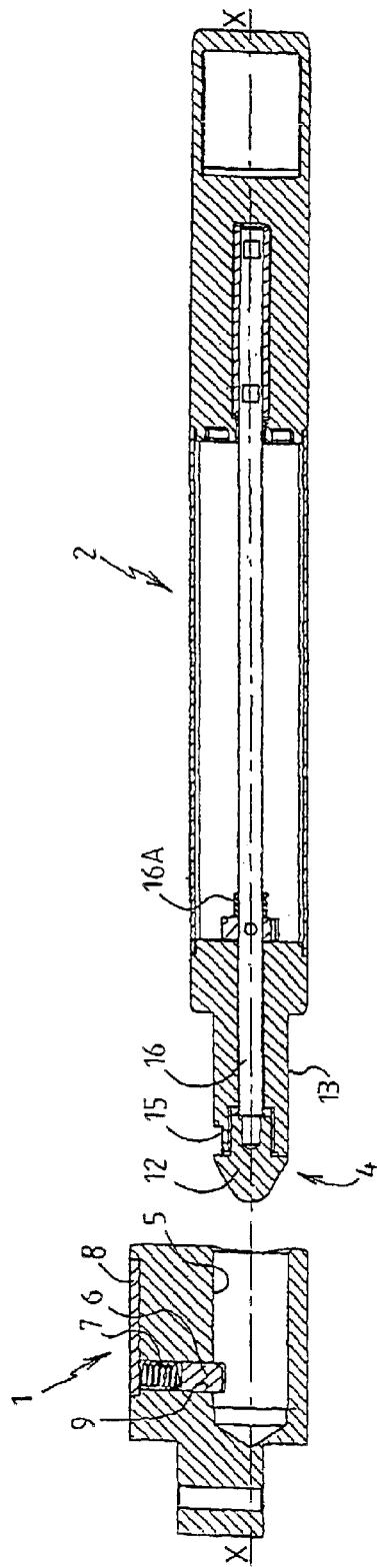
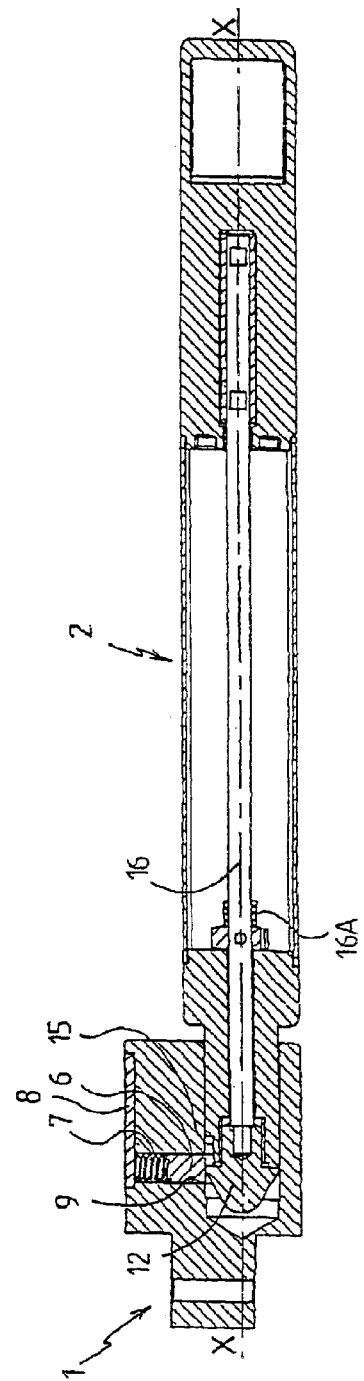
FIG.3
FIG.4

ASSEMBLY OF TWO PARTS ONE OF WHICH IS FIXED AND THE OTHER REMOVABLE, USED FOR EXAMPLE FOR EQUIPPING A SURGICAL TABLE

The present invention relates to an assembly of two parts, one of which is fixed and the other of which is removable, the assembly including automatic locking and unlocking means for securing the removable part to the fixed part.

Such an assembly can be used in very numerous applications in a variety of technical fields, in particular for a surgical table provided with a removable plate for supporting the patient's legs.

As is known, a surgical table comprises a horizontal table top on which the patient can be laid prone, the table top resting on a vertical pillar. The table top is made up of a plurality of sections, specifically: a head rest; a back support plate; a plate for supporting the behind; and a plate for supporting the legs.

A device is known for assembling the fixed portion of the surgical table to a removable plate for supporting the legs, which device has two longitudinally projecting tips secured to the fixed portion of the table. Those tips constitute male portions onto which there are engaged corresponding female portions that are formed by complementary housings in longitudinally-extending plate support members. That coupling system is associated with an operating device comprising a hook for each longitudinally-extending member associated with a safety device. The safety device comprises a removable wedge for preventing a drive lever that projects beneath the longitudinally-extending member from running the risk of being actuated inadvertently by the surgeon of by an assistant.

Such an assembly presents several drawbacks: firstly, once the longitudinally-extending plate support members have been removed, the projecting portions formed by the lateral support tips secured to the fixed portion remain in place, and they run the risk of catching the surgeon or one of the assistants.

Secondly, the closure device of that assembly comprises a hook which opens and closes suddenly under drive from a spring when it is operated, thus running the risk of pinching the surgeon's fingers. Finally, the need to provide mechanical safety means constituted by a removable wedge, itself constitutes an additional constraint.

An object of the invention is to provide an assembly of the above type suitable for use in very many applications other than surgical tables, and in which the above-mentioned drawbacks are eliminated.

In accordance with the invention, the unlocking means are mounted on the removable part and are integrated inside it.

It is thus possible to eliminate the outwardly-projecting hook which is actuated suddenly by a spring in the prior art, because unlocking means are now integrated inside the removable part, without said means projecting significantly to the outside.

In an embodiment of the assembly of the invention, the removable part has a male end adapted to be received in a complementary female end of the fixed part, the male end snap-fastening against a stop latch inside said female end, said latch being urged resiliently by a spring into a position in which it locks the male end in the female end.

This structure presents the particular advantage of eliminating any projecting tips when the removable part is separated from the fixed part, since the male end is secured to the removable part, and no longer to the fixed part as in the prior art. For a surgical table, the projecting tips thus no longer run the risk of hindering the surgeon or the assistants during the period of time in which the leg support plate and its longitudinally-extending members are separated from the fixed part of the table.

In addition, because locking is automatic, it is no longer possible to separate the leg support plate accidentally from the fixed part of the table when using the assembly of the invention. As a result, an additional mechanical abutment becomes superfluous since there is no longer any danger of a part (a lever or handle driven by a spring) returning in troublesome manner. This provides additional safety for the patient and for the surgeon.

According to additional characteristics of the invention:

the latch is urged by said spring in a direction that extends transversely to the direction in which the male end is inserted, the latch being received inside a duct arranged in the wall of said female end;

the male end has a cone mounted at the end of the removable part in such a manner that, while the cone is being inserted into the female end, the latch can slide over the cone, thereby compressing its return spring;

the cone presents a flat, the male end has a segment placed behind the cone and presenting a recess for receiving the latch, said recess opening in register with the cone, and the cone is movable relative to the segment between a locking position in which the flat is out of alignment with the recess, thereby holding the latch captive in the recess, and an unlocking position in which the flat is in alignment with the recess, thereby allowing the latch to be released;

the cone is secured to the end of a spindle placed in the removable part and capable of turning about its own longitudinal axis;

the spindle is fitted with a handle projecting laterally into a window of the removable part so as to be capable of being actuated manually to enable the cone to be unlocked from the latch of the fixed part, said unlocking being performed by turning the spindle about its longitudinal axis by means of the handle;

it has resilient return means for returning the cone into its locking position;

the removable part is a longitudinally-extending member having the male end projecting from one end thereof; and the assembly is part of a surgical table in which the longitudinally-extending member supports a removable plate for supporting the legs of a patient, each side of the plate being carried by such a longitudinally-extending member, the two longitudinally-extending members being associated with two respective female fixed parts of the table.

The invention is described below with reference to the accompanying drawings, which show an embodiment by way of non-limiting example:

FIG. 3 is a longitudinal section view of the FIG. 1 assembly while the two parts are decoupled;

FIG. 4 is a longitudinal section view analogous to that of FIG. 3 showing the assembly of the invention during the stage in which the two parts are being coupled together;

Figure 1:
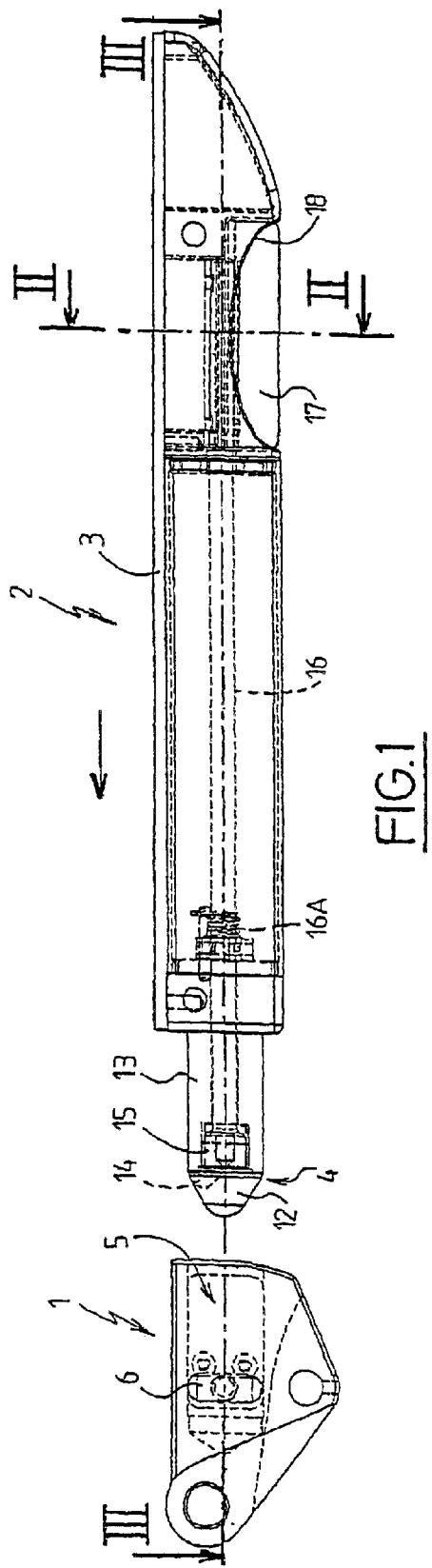
FIG. 1 is an elevation view of an embodiment of an assembly in accordance with the invention, the assembly comprising two parts, one of which is fixed and the other removable, and it is intended in particular for a surgical table.

The device shown in the figures is an assembly of two parts 1 and 2 comprising respectively a fixed part and a moving part. As mentioned above, such a device can be used in very numerous applications in a variety of technical fields, such as, by way of example, being fitted to a surgical table of structure that is conventional in itself and not shown apart from a plate 3 suitable for supporting the legs of a patient (FIG. 1). The remainder of the table is conventional with the exception of its end 1 constituting the fixed part of the assembly and forming part of one side of the section that is to support the patient's behind.

Two assemblies 1, 2 are provided on respective sides of the support plate 3, and only one of them is shown in the drawings.

The fixed part 1 is, for example, hinged to the end of the central portion of the table. It constitutes a rectangular box defining a housing whose function is described below.

In the example described, the removable part 2 constitutes a longitudinally-extending side support member of the plate 3. This removable part 2 has a moving male end 4 adapted to be received in a complementary female end 5 constituted by the housing of the fixed part 1, and to snap engage a stop latch 6 inside the female end 5.

As shown in FIG. 3, this latch 6 is urged resiliently by a spring 7 into a position where it locks the male end 4 in the female end 5. For this purpose, the spring 7 is received in a duct 9 extending transversely through the wall of the fixed part 1, at a location that is appropriate relative to the adjacent end of the removable part 2. The duct 9 opens out radially into the housing 5. The spring bears both against the latch 6 and against a plate 8 which closes the duct 9.

The spring 7 continuously urges the latch 6 to project into the inside of the housing 5 while remaining retained in the duct 9.

Thus, the latch 6 is urged resiliently by the spring 7 towards a locking position in which it locks the male end 4 in the female end 5.

The male end 4 is constituted by a cone 12 mounted so as to be free to rotate about its axis X—X at the end of the removable part 2. At its end carrying the cone 12, the removable part 2 presents a cylindrical segment 13 of diameter corresponding to the diameter of the recess 5. The cone 12 can move angularly about the axis of the cylindrical segment 13 which is stationary in the moving part 2. The shape of the cone 12 is such that the latch 6 can slide over the cone, comprising its return spring 7, while the cone 12 is being inserted into the female end 5.

The cone 12 has a flat 14 formed thereon which terminates at the base of the cone, having a diameter equal to the diameter of the cylindrical segment 13 (FIGS. 3 and 4). In addition, in a determined angular sector, the cylindrical segment 13 has a recess 15 forming a flat. The recess is open to the end of the cylindrical segment 13. It is of dimensions that are suitable for receiving the end of the latch 6.

The cone 12 is also secured to the end of a coaxial spindle 16 placed inside the removable part 2 and capable of turning about its longitudinal axis X—X.

The spindle 16 is free to turn between: a locking position in which the assembly is locked, in which the cone 12 is also in a locked position, the flat 14 and the recess 15 then being angularly offset; and an unlocking position in which the cone 12 is likewise in an unlocking position, the flat 14 then being in alignment with the recess 15.

Resilient return means 16A urge the spindle 16 into its locking position, said means being disposed between the spindle and the body of the removable part 2. By way of example, these means are formed by a spiral spring surrounding the spindle 16.

At its end remote from the cone 12, the spindle 16 is fitted with a handle 17 that projects laterally into a window 18 formed in one of the sides of the longitudinally-extending member 2.

By manually actuating the handle 17, which handle is accessible beneath the longitudinally-extending member 2 when it is assembled to the fixed part 1 (FIG. 6), this arrangement enables the entire spindle 16 to be turned about its longitudinal axis X—X, thereby likewise causing the male end 4 to turn about said axis relative to the latch 6, which remains secured to the inside wall of the fixed part 1.

The top portion of the handle 17 is extended by a tab 19 whose end is free to turn angularly about the axis X—X in a second window 21 of the longitudinally-extending member 2. The actuator handle 17 and the tab 19 secured thereto are fixed to the spindle 16 by means of a suitable element such as a screw 22 (FIG. 2).

The removable part 2 is locked and unlocked relative to the fixed part 1 as follows.

Figure 2:
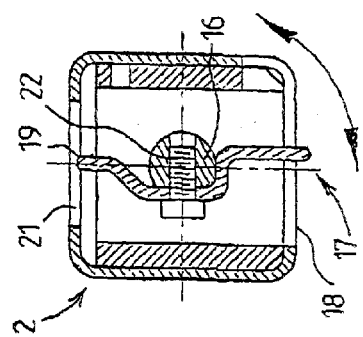
FIG. 2 is a cross-section view of the moving part of the assembly while the two parts are decoupled.

While the removable part 2 is initially separate from the fixed part 1, it is in the form shown in FIGS. 1 to 3.

As shown in FIG. 4, the operator inserts the cone 12 whose end is advantageously rounded into the housing 5, inside which it slides until it comes up to the latch 6.

So long as the handle 17 is not actuated, the spindle 16 and the cone 12 are in their locking position and the flat 14 is not in alignment with the recess 15. During insertion, the latch 6 slides over the wall of the cone 12, thereby progressively compressing its return spring 7. By continuing to push against the part 2, the cone 12 is caused to go completely past the latch 6 such that the spring 7 acting against the latch 6 relaxes and automatically brings the latch 6 into its locking position. The latch 6 is thus engaged in the recess 15 beyond the base of the cone 12, which cone is in its position for locking the part 2 to the fixed part 1. The operations of assembly and locking are thus terminated.

Figure 5:
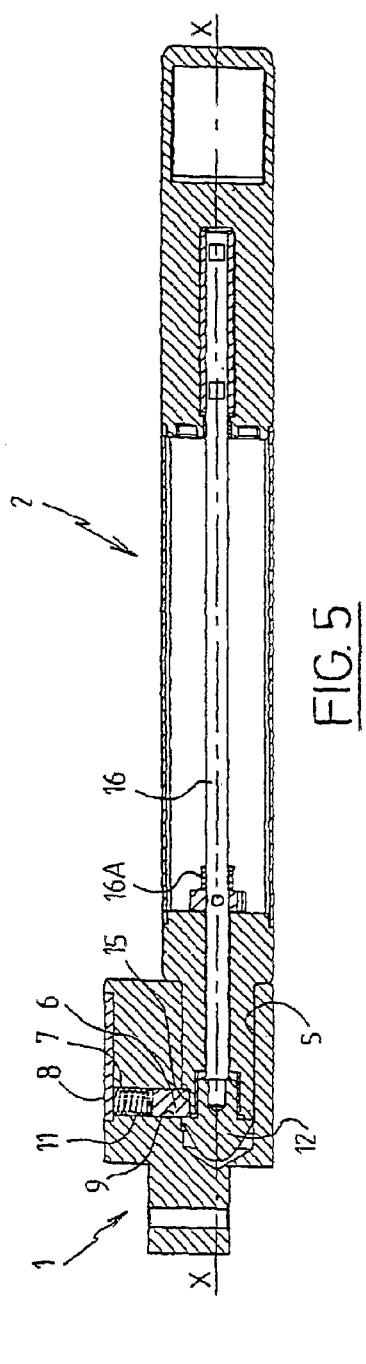
FIG. 5 is a longitudinal section view analogous to those of FIGS. 3 and 4 once the two parts of the assembly have been coupled together.

As shown in FIG. 5, the latch 6 which cannot move along the axis X—X is received between the base face of the cone 12 and the shoulder defined by the flat 15 in the cylindrical segment 13. The removable part 2 is thus itself prevented from moving along the axis X—X by the latch which is received in the recess 15.

Figure 6:
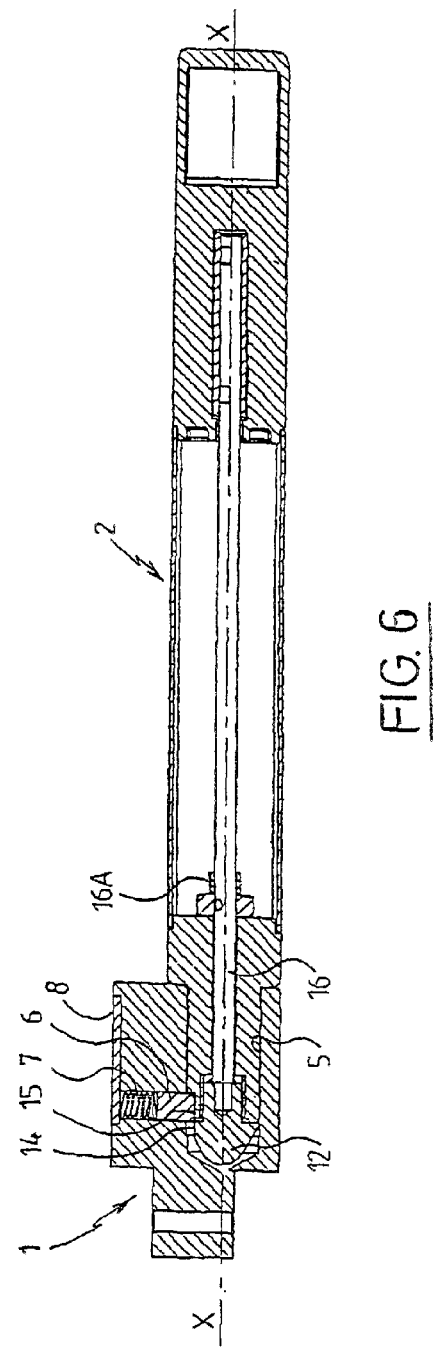
FIG. 6 is a longitudinal section view analogous to the views of FIGS. 3 to 5 during decoupling of the two parts of the assembly.

For unlocking purposes, it suffices for an operator, e.g. a surgeon or a surgeon's assistant supposing the parts 1 and 2 are parts of a surgical table, to turn the handle 17 in the appropriate direction against the return spring 16A of the spindle. This operation causes the male end 4 to turn about the longitudinal axis X—X so that the flat 14 comes into register with the latch 6, as shown in FIG. 6. It then suffices to apply longitudinal traction to the removable part 2 to enable the latch 6 to slide over the flat 14 and unlock the part 2 completely, which part can then be separated without difficulty from the fixed part 1.

In addition to the above-mentioned technical advantages, the assembly of the invention presents the following advantages:

the locking and unlocking mechanism is extremely simple to use and it avoids leaving projecting tips on the fixed part after the removing part has been separated therefrom, because of the way in which the male ends 4 are arranged on the removable part 2;

the locking and unlocking mechanism is fully integrated inside the parts 1 and 2 and therefore does not present any kind of hook or lever that projects outwards; and safety against any inadvertent unlocking is provided without requiring a wedge or other additional member to be added, with this being made possible by the arrangement of the cone 12, the flat 14, and the recess 15, which operates automatically.

The device for actuating unlocking is ergonomic, reliable, and safe by construction because it is integrated in the longitudinally-extending member 2. Furthermore, integrating the unlocking actuator in the removable part 2 makes it easier to clean the leg support plate 3 if the assembly of the invention is applied to a surgical table.

What is claimed is:

1. An assembly of two parts, one of which is fixed and the other of which is removable, the assembly being of the type including automatic locking and unlocking means for securing the removable part to the fixed part, said unlocking means being mounted on the removable part and being integrated inside it, and in which the removable part has a male end adapted to be received in a complementary female end of the fixed part, the male end snap-fastening against a stop latch inside said female end, said latch being urged resiliently by a spring into a position in which it locks the male end in the female end, which male end has a cone mounted at the end of the removable part in such a manner that, while the cone is being inserted into the female end, the latch can slide over the cone, thereby compressing its return spring, wherein the cone presents a flat, wherein the male end has a segment placed behind the cone and presenting a recess for receiving the latch, said recess opening in register with the cone, and wherein the cone is movable relative to the segment between a locking position in which the flat is out of alignment with the recess, thereby holding the latch captive in the recess, and an unlocking position in which the flat is in alignment with the recess, thereby allowing the latch to be released.

2. An assembly according to claim 1, wherein the latch is urged by said spring in a direction that extends transversely to the direction in which the male end is inserted, the latch being received inside a duct arranged in the wall of said female end.

3. An assembly according to claim 1, wherein the cone is secured to the end of a spindle placed in the removable part and capable of turning about its own longitudinal axis.

4. An assembly according to claim 3, wherein the spindle is fitted with a handle projecting laterally into a window of the removable part so as to be capable of being actuated manually to enable the cone to be unlocked from the latch of the fixed part, said unlocking being performed by turning the spindle about its longitudinal axis by means of the handle.

5. An assembly according to claim 1, having resilient return means for returning the cone into its locking position.

6. An assembly according to claim 1, wherein the removable part is a longitudinally-extending member having the male end projecting from one end thereof.

7. An assembly according to claim 6, forming part of a surgical table, in which the longitudinally-extending member supports a removable plate for supporting the legs of a patient, each side of the plate being carried by such a longitudinally-extending member, the two longitudinally-extending members being associated with two respective female fixed parts of the table.

8. A surgical table fitted with an assembly according to claim 1.

* * * * *